United States Patent [19]

Kosugi et al.

[11] Patent Number: 4,823,840
[45] Date of Patent: Apr. 25, 1989

[54] CHANGEOVER VALVE

[75] Inventors: Seiji Kosugi; Yoshio Asou, both of Soka, Japan

[73] Assignee: SMC Corporation, Tokyo, Japan

[21] Appl. No.: 137,808

[22] Filed: Dec. 24, 1987

[30] Foreign Application Priority Data

Dec. 29, 1986 [JP] Japan .................... 61-202659[U]

[51] Int. Cl.⁴ .......................................... F16K 11/044
[52] U.S. Cl. ........................... 137/625.27; 137/625.5; 251/357
[58] Field of Search ............... 137/625.67, 625.5, 375; 251/357

[56] References Cited

U.S. PATENT DOCUMENTS

| | | | |
|---|---|---|---|
| 3,552,426 | 1/1971 | Hester | 137/375 |
| 4,074,700 | 2/1978 | Engle | 137/625.27 |
| 4,522,374 | 6/1985 | Neff | 137/375 X |
| 4,615,353 | 10/1986 | McKee | 137/625.27 X |

Primary Examiner—Alan Cohan
Attorney, Agent, or Firm—Oblon, Fisher, Spivak, McCelland & Maier

[57] ABSTRACT

A changeover valve has a valve body formed on a valve rod in such a manner as to be detached from forming molds and easily and securely mounted on a projection formed on the valve rod. The valve body is bisected at the center of the projection on the valve rod and has a mechanism for effectively preventing the downward penetration of compressed air from the edge of the bisected segment. The changeover valve has a valve rod carrying a valve body that switches the flow of fluid between individual ports by coming in and out of contact with two opposite valve seats. The valve rod has an annular projection on which the valve body of elastic substance is to be fitted. While a first annular groove is provided on each side of the annular projection, a second annular groove is cut at the center of the annular projection. The valve body is bisected into two segments that are individually mounted on both sides of the second groove. Each valve body segment has an integrally formed first and a second fitting projection adapted to fit in the first groove and the common second groove. The second fitting projection on the bisected valve body segment has an annular flange extending inward toward the valve rod. The flange has a bore whose diameter is reduced to a minimum within such a limit as will not interfere with the detachment of forming molds.

9 Claims, 2 Drawing Sheets

CHANGEOVER VALVE

FIELD OF THE INVENTION

This invention relates to a changeover valves for use in hydraulically or pneumatically operated industrial machines.

DESCRIPTION OF THE PRIOR ART

A poppet changeover valve of the known type, as shown in FIG. 8, comprises a valve body 1 of elastic substance, such as synthetic rubber, fastened over a circular projection 5 provided on a valve rod 4 so that the openings at valve seats 6 and 7 are opened and closed as the valve rod 4 moves axially.

The valve body 1 of this type, however, often comes off from the projection 5 when thrust upward by the penetration of compressed air flowing between the valve ports into a space left between the valve body and the rod 4. This trouble occurs when part of the compressed air surrounding the valve body 1 penetrates therebeneath. As the pressure around the valve body 1 drops when the compressed air is discharged, the entrapped air causes a sudden pressure buildup that thrusts the valve body upwardly. As such, this problem occurs frequently where major pressure variation takes place around the valve body.

A conventional solution applied for preventing a valve body 1 from coming off is to increase the bore diameter difference d between the middle portion 3 and the end portions 2 on both sides thereof by reducing to a minimum the diameter of the bore in the latter portions. When the bore diameter difference d is thus increased, however, it becomes difficult to remove an inner mold placed inside the valve body 1 for forming. Excessive force applied in an attempt to take out the inner mold could break the formed valve body 1. Even a successfully formed valve body then presents considerable difficulty in fitting onto a valve rod. As such, the bore diameter difference d cannot be increased beyond a certain limit. Within such a limit, no valve bodies completely free of the aforementioned problem have so far been obtained.

SUMMARY OF THE INVENTION

An object of this invention is to provide a poppet valve of the type described above which has a valve body that is appropriately divided to facilitate separation from forming molds and permit easy and firm attachment onto a projection provided on a valve rod.

Another object of this invention is to provide a valve structure having a valve body bisected at the center of a projection on a valve rod and means to effectively preventing the penetration of compressed air into the lower portion of the valve body, thereby permitting an increase in the bore diameter difference d and preventing the the valve body from coming off.

In a changeover valve of this invention designed to achieve the above objects having a slidable valve rod carrying a valve body of elastic substance adapted to switch the flow of fluid between a plurality of ports by coming in and out of contact with the two opposite valve seats provided in a valve casing, the valve rod has an annular projection on which the valve body of elastic substance is to be fitted in that portion which is between said paired valve seats, a first annular groove provided by reducing the diameter of the valve rod itself on each side of said annular projection and a common second annular groove at the center of said annular projection, the valve body to be fitted on said annular projection is divided into two segments adapted to be individually fitted on both sides of the second annular groove, each segment having an integrally formed first fitting projection and a second fitting projection adapted to fit in said first and second annular grooves, with the second fitting projection on each bisected segment having an annular flange projecting inward or toward the valve rod and having such a bore diameter as is reduced to a minimum within the limit that each detachment of forming molds is assured.

In this type of changeover valve, the first and second fitting projections having considerably different bore diameters fit into the first annular groove and the second annular groove in the annular projection, thereby preventing the first fitting projection from having thrust upward by compressed air.

The second fitting projection provided on each segment of the bisected valve body extends inward or toward the valve rod to leave the smallest possible bore at the center thereof. When fitted into the second annular groove, therefore, the second fitting projection bites deep enough into the valve rod to provide adequate resistance to an axial thrust. Even if axially thrust occurs, the second fitting projection on one segment would simply be pressed against that on the other, without getting moved radially. Consequently, neither segment will come off from the valve rod on the side of its second fitting projection.

Bisection of the valve body facilitates both detachment from forming molds and fitting onto the annular projection on the valve rod.

DESCRIPTION OF THE PREFERRED EMBODIMENTS

Figure 1:
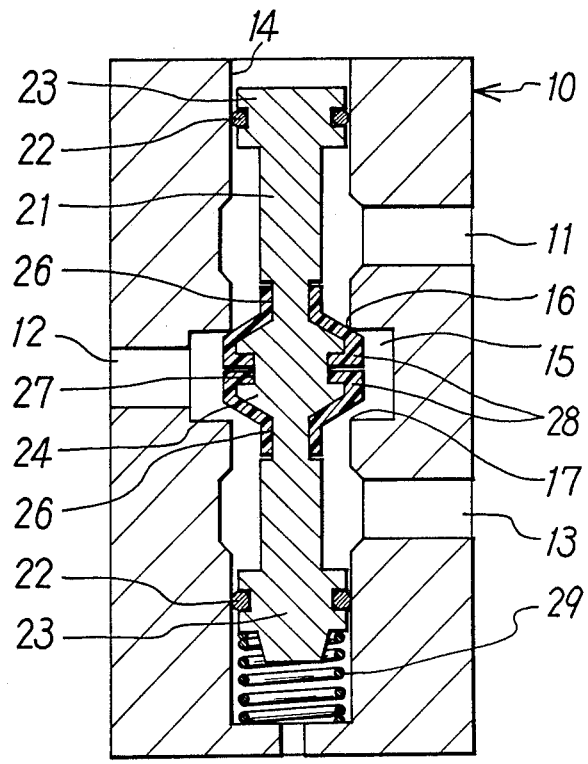
FIG. 1 is a vertical cross-sectional front view of a first preferred embodiment of this invention.
Figure 2:
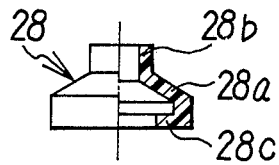
FIG. 2 is a partially cross-sectional vertical front view of a bisected segment of a valve body of the same embodiment.

FIGS. 1 and 2 show a first preferred embodiment of this invention, in which a valve casing 10 has an inlet port 11, an outlet port 12 and an exhaust port 13. The ports 11, 12 and 13 communicate with each other by means of a bore 14 provided in the valve casing. The diameter of the bore 14 is increased to form a valve chamber 15 at the junction with the outlet port 12. A first valve seat 16 leading to the inlet port 11 and a second valve seat leading to the exhaust port 13 are provided at axially opposite ends of the valve chamber 15.

A valve rod 21 inserted in the bore 14 has a sealing end 23 carrying a seal 22 at each end thereof and an annular projection 24 having a substantially trapezoidal axial cross-section in the middle portion thereof situated between the two valve seats. While a first annular groove 26 is provided on each side of the annular projection 24 by a reduced diameter of the valve rod itself, a second annular groove 27 having a substantially larger bore diameter than the first annular groove 26 is provided at the center of the annular projection 24.

A valve body fitted onto the annular projection is bisected into two segments 28 which are adapted to be individually fitted onto the annular projection on both sides of the second annular groove 27 cut therein. Made of elastic material, such as synthetic rubber, the bisected segments 28 open and close the openings at the valve seats 16 and 17 by coming in and out of contact therewith. Each segment comprises, as shown in FIG. 2, a main portion 28a whose inner profile matches the outer profile of the annular projection 24 divided by the second annular groove 27 and a first fitting projection 28b and a second fitting projection 28c integrally formed on both sides of the main portion 28a. The segment 28 is attached to the annular projection 24 by fitting the first cylindrical fitting projection 28b of smaller diameter into the first groove 26 and the second fitting projection 28c having an inwardly projecting flange into the common second groove 27. The bore diameter of the flange on the second fitting projection that extends inward or toward the valve rod is reduced to a minimum within such a limit as not to interfere with easy detachment of forming molds.

The first fitting projection 28b and the second fitting projection 28c provided on both sides of the main portion 28a of the valve body segment 28 fit into the first groove 26 of smaller diameter and the second groove 27 in the annular projection 24 of larger diameter, respectively. The large difference in the diameter between the two parts prevents the first fitting projection 28b from being pushed up by compressed air.

Where the valve body is bisected at the center of the annular projection 24, a second fitting projection 28c is provided on each of the bisected segments. The second fitting projection extends inward toward the valve rod and has a bore diameter reduced to the greatest possible extent. Thus, the second fitting projection 28c bites radially deep enough into the valve rod, so that any compressed air entrapped between the valve disc segment 28 and the valve rod 21 hardly pushes away the body segment 28 radially. Any movement that might be caused by such entrapped air will be in the direction of the axis of the valve rod 21 or the direction in which the second fitting projection on one of the paired bisected segments 28 is pressed against that on the other. Therefore, the valve body segment will not come off from the valve rod 21. Furthermore, the mutual interference of the second fitting projections 28c on the two bisected segments 28 resulting from the fitting on the common second groove 27 prevents the segments 28 from slipping away therefrom.

Bisection of the valve body facilitates both detachment from forming molds and fitting on the projection on the valve rod.

The valve rod 21 slidably inserted in the bore 14 in the valve casing 10 is urged in the reset direction by means of a reset spring 29 interposed between the end surface of the valve rod 21 and the bottom of the valve bore 14. When driven against the urging force of the reset spring 29 by an operating mechanism, not shown, provided at the opposite end, the valve rod 21 switches the flow of fluid between the individual ports. The valve rod driving mechanism may be mechanical, hydraulic, magnetic or otherwise.

The valve rod 21 carrying the valve body segments 28 is inserted from one end of the valve bore 14 into the valve coating 10 while compressing the valve body segments 28 by means of an appropriate jig.

Figure 3:
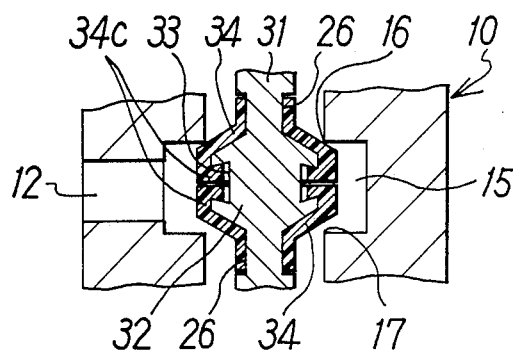
FIGS. 3 to 5 are vertical cross-sectional views showing part a second to fourth preferred embodiment of this invention.

FIG. 3 shows a second preferred embodiment of this invention, in which a second annular groove 33 cut in a projection 32 on a valve rod 31 has a dovetail-like cross section. A second fitting projection 34c provided on a bisected valve body segment 34 is so shaped as to come in contact with only the side walls of the second groove 33, but not with the bottom wall thereof.

The bisected segment 34 is securely attached to the valve rod 31 by means of the second fitting projection 34c that comes in contact with the side walls of the dovetail-shaped second groove 33. A space left between the foremost end of the second fitting projection 34c and the second groove 33 prevents the entrapping of air during assembling. In assembling the valve body segments, air is likely to penetrate between the second fitting projection 34c and the side walls of the second groove 33. But the space left between the foremost end of the second fitting projection 34c and the second groove 33 as mentioned above is conducive to preventing the entrapping of such air and the inflow of compressed air from outside. To prevent the entrapping of such air, air should be allowed to flow freely between the two second fitting projections 34c, placed face to face. Accordingly, clearance to allow the passage of air is usually provided between the adjoining second fitting projections 34c. The facing surfaces of the two second fitting projections 34c may be roughened so that the passage of air is always maintained even when one of them is pressed against the other. Or, many indentations or radial grooves or other appropriate means may be provided on the facing surfaces. Such provision further secures the fastening of the valve body segments 34 to the valve rod 31.

The clearance left between the second fitting projections 28c of the first embodiment shown in FIG. 1 also functions similarly. So does the clearance in each of the embodiments to be described hereafter, as well.

Other structural details and functions of the second preferred embodiment are substantially the same as those of the first preferred embodiment. Therefore, no detailed description will be given to similar parts which will be designated by similar reference characters.

Figure 4:
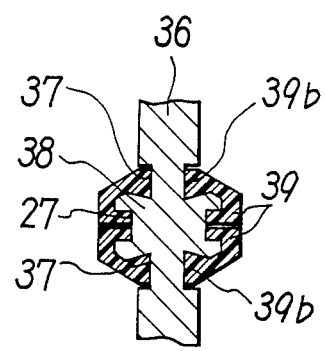

FIG. 4 shows a third preferred embodiment of this invention, in which a first annular groove 37 cut in a valve rod 36 has one side wall thereof closer to a projection 38 is tapered toward the base of the projection 38, with a first fitting projection 39b on a bisected valve body segment 39 being formed to come in contact with said tapered side wall. In this embodiment, the valve body segments 39 are fastened to the valve rod with greater force provided by the engagement of the first fitting projection 39b with the tapered surface of the first groove 37.

Figure 5:
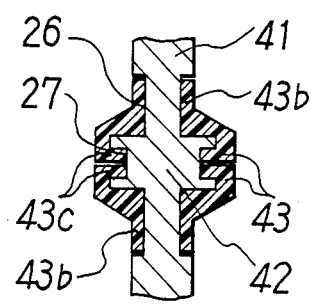

FIG. 5 shows a fourth preferred embodiment of this invention, in which a projection 42 provided on a valve rod 41 has a rectangular cross section. A first fitting projection 43b and a second fitting projection 43c on a valve body segment 43 are shaped so as to come in contact with the side wall of the projection 42 and the inner wall of the second groove. This design increases the force with which the valve body segment 43 is fastened to the projection 42.

Figure 6A:
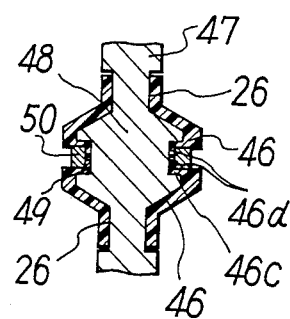
In FIG. 6, A is a vertical cross-sectional view showing part of a fifth preferred embodiment of this invention, B and C are perspective views showing examples of a reinforcing ring used in the fifth embodiment.
Figure 6B:
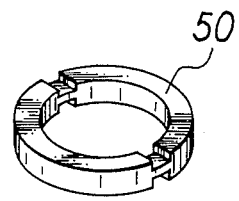
Figure 6C:
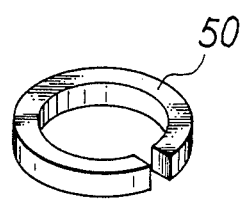

A sketch A in FIG. 6 shows a fifth preferred embodiment of this invention, in which a second fitting projection 46c on a bisected valve body segment 46 has a bent portion 46d adapted to come in contact with the bottom of a second groove 49 provided in a projection 48 on a valve rod 47. The two segments 46 are securely fastened to the valve rod 47 by tightening the bent portions 46d by means of an elastic reinforcing ring 50 interposed between the second fitting projections 46c provided thereon.

The elastic reinforcing ring 50 used in this embodiment is not necessary if the second fitting projection 46c itself is so shaped as to prevent a falloff. The thinner second fitting projections 46c and bent portions 46d and a very small clearance (0.1 mm or thereabout) left between the two bent portions 46d permit easy assembling because the second fitting projections 46c on the adjoining valve body segments 46 are thus allowed to change their shape with greater ease, without interfering with each other.

The reinforcing ring 50 may be either a ring of elastic substance whose elasticity is increased by means of narrowed portions provided thereon as shown at B of FIG. 6, or a ring of springy substance having a notch cut therein as shown at C of FIG. 6. In this embodiment too, surface irregularities are provided on the mating faces of the second fitting projections 46c and the bent portions 46d to prevent the valve body segments 46 from being thrust upward by compressed air.

Figure 7:
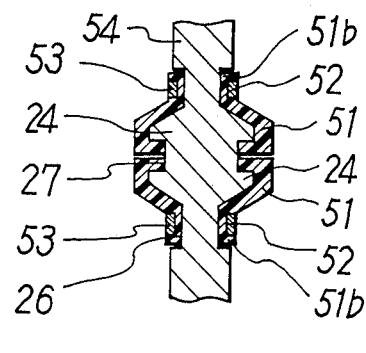
FIG. 7 is a vertical cross-sectional view showing part of a sixth preferred embodiment of this invention.
Figure 8:
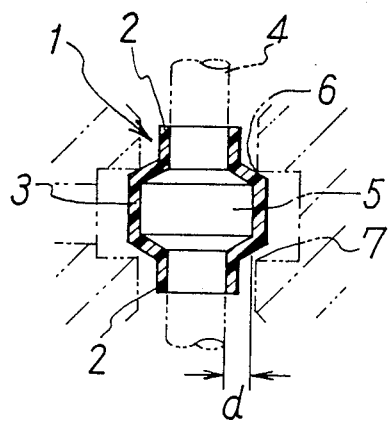
FIG. 8 is a cross-sectional view of a conventional valve body.

FIG. 7 shows a sixth preferred embodiment of this invention, in which a bisected valve body segment 51 has a groove 52 cut in a first fitting projection 51b. The valve body segments 51 is securely fastened to a valve rod 54 by means of a reinforcing ring 53 similar to the one shown at C of FIG. 6 fitted in the groove 52.

Other structural details and functions of the third to sixth preferred embodiments are the same as those of the first embodiment. So no detailed description will be given to similar or corresponding parts thereof that are designated by similar reference characters as needed.

This invention is by no means limited to the preferred embodiments described above. For example, the second fitting projection 28c of the first embodiment may be made slightly shorter than the depth of the second groove 33, thereby preventing the entrapping of air that might otherwise be caused by the second fitting projection 28c. Difference features of the individual embodiments may be combined appropriately, too.

What is claimed as new and desired to be secured by letters patent of the United States is:

1. In a poppet changeover valve having a slidable valve rod carrying a valve body adapted to switch the flow of fluid between a plurality of ports in a valve casing by coming in and out of contact with two opposite valve seats provided therein, the improvement which comprises:

an annular projection on which a valve body of an elastic substance is to be fitted being provided in a portion of the valve rod between said two valve seats, a first annular groove being provided on each side of the annular projection by a reduced diameter of the valve rod and a second annular groove being cut at the center of the annular projection;

a valve body fitted on the annular projection being bisected into two segments individually mounted on both sides of said second annular groove;

each of the bisected valve body segments having first and second fitting projections integrally formed thereon and adapted to fit into the first groove and the common second groove; and the second fitting projection on the bisected valve body segment having an annular flange projecting inward toward the valve rod, the annular flange having a bore whose diameter is reduced to a minimum within a limit that will permit detachment from forming molds.

2. The improvement according to claim 1, in which the annular projection on the valve rod has a substantially trapezoidal axial cross-sectional profile, the second annular groove having a larger inside diameter than the first annular groove.

3. The improvement according to claim 1, in which the second annular groove having a dovetail-like cross section is cut in the projection of the valve rod, the second fitting projection on the bisected valve body segment being shaped so as to come into contact with the side walls of said second annular groove without contacting the bottom wall thereof.

4. The improvement according to claim 1, in which a free passage for air is formed between the second fitting projections of the bisected valve body segments.

5. The improvement according to claim 1, in which the side wall of the first annular groove on the valve rod closer to the projection thereon is tapered toward the base of the projection and the first fitting projection on the bisected valve body segment is shaped to match the tapered side wall.

6. The improvement according to claim 1, in which the annular projection formed on the valve rod has a rectangular cross section and the first fitting projection on the bisected valve body segment is held in contact with the side wall of said projection.

7. The improvement according to claim 1, in which the second fitting projection on the bisected valve body segment has a bent portion adapted to come in contact with the bottom surface of the second annular groove cut in the projection on the valve rod and the valve body segment is fastened to the valve rod by tightening the bent portion with an elastic reinforcing ring interposed between the second fitting projections of the two adjoining valve body segments.

8. The improvement according to claim 1, in which an air-flow clearance is left between the second fitting projection and bent portion of the bisected valve body segment and the reinforcing ring.

9. The improvement according to claim 1, in which the bisected valve body segment is fastened to the valve rod by fitting a reinforcing ring in a groove cut in the first fitting projection thereof.

* * * * *